United States Patent
Fortusini et al.

(10) Patent No.: US 9,170,376 B2
(45) Date of Patent: Oct. 27, 2015

(54) OPTICAL PORT HAVING A COVER WITH A MOLDED-IN LENS

(71) Applicant: Corning Cable Systems LLC, Hickory, NC (US)

(72) Inventors: Davide Domenico Fortusini, Ithaca, NY (US); Micah Colen Isenhour, Lincolnton, NC (US); Dennis Michael Knecht, Hickory, NC (US); James Phillip Luther, Hickory, NC (US); Claudio Mazzali, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 304 days.

(21) Appl. No.: 13/802,974

(22) Filed: Mar. 14, 2013

(65) Prior Publication Data

US 2014/0169741 A1 Jun. 19, 2014

Related U.S. Application Data

(60) Provisional application No. 61/737,408, filed on Dec. 14, 2012.

(51) Int. Cl.
*G02B 6/32* (2006.01)
*G02B 6/38* (2006.01)

(52) U.S. Cl.
CPC ... *G02B 6/32* (2013.01); *G02B 6/38* (2013.01)

(58) Field of Classification Search
CPC ..................................... G02B 6/32; G02B 6/38
See application file for complete search history.

(56) References Cited

U.S. PATENT DOCUMENTS

| | | | | |
|---|---|---|---|---|
| 6,012,852 A * | 1/2000 | Kadar-Kallen et al. | ......... | 385/74 |
| 6,146,025 A * | 11/2000 | Abbink | ................ | G02B 6/4238 |
| | | | | 385/88 |
| 6,489,607 B1 * | 12/2002 | Nakano | ......... | 250/239 |
| 6,853,767 B1 | 2/2005 | Farr et al. | ......... | 385/33 |
| 6,863,448 B2 | 3/2005 | Chiu et al. | ......... | 385/88 |
| 7,128,474 B2 * | 10/2006 | Giboney et al. | ................ | 385/92 |
| 7,505,650 B1 | 3/2009 | Grzybowski et al. | ......... | 385/33 |
| 7,517,222 B2 * | 4/2009 | Rohrbach | ......... | H01R 13/6205 |
| | | | | 439/39 |
| 7,841,776 B2 * | 11/2010 | DiFonzo et al. | ................ | 385/57 |
| 8,079,125 B2 * | 12/2011 | Ban et al. | ......... | 29/407.09 |
| 8,309,908 B2 | 11/2012 | Sherrer et al. | ................ | 250/239 |
| 8,995,806 B2 * | 3/2015 | Lam et al. | ......... | 385/33 |
| 9,091,829 B2 * | 7/2015 | Bradley | ......... | G02B 6/4293 |
| | | | | 1/1 |
| 2004/0096165 A1 * | 5/2004 | Childers et al. | ................ | 385/92 |
| 2008/0044141 A1 * | 2/2008 | Willis et al. | ......... | 385/88 |
| 2011/0229093 A1 | 9/2011 | McCollough | ................ | 385/92 |
| 2013/0343698 A1 * | 12/2013 | Ko | ......... | 385/14 |
| 2014/0169742 A1 * | 6/2014 | Bhagavatula | ......... | G02B 6/3821 |
| | | | | 385/52 |
| 2014/0169745 A1 * | 6/2014 | Isenhour | ......... | G02B 6/3829 |
| | | | | 385/77 |

* cited by examiner

*Primary Examiner* — Daniel Petkovsek

(57) ABSTRACT

Disclosed are optical ports and devices having a cover with at least one molded-in lens and a mounting body having a recess for mounting the cover to the mounting body along with a mounting surface for securing an optical port. The molded-in optical lenses of the cover may be aligned with one or more active components for receiving or transmitting the optical signal. The active components may be mounted on a circuit board that may include an electrical tether. In one embodiment, the optical port includes a pocket having an alignment feature such as a piston that is translatable during mating.

39 Claims, 15 Drawing Sheets

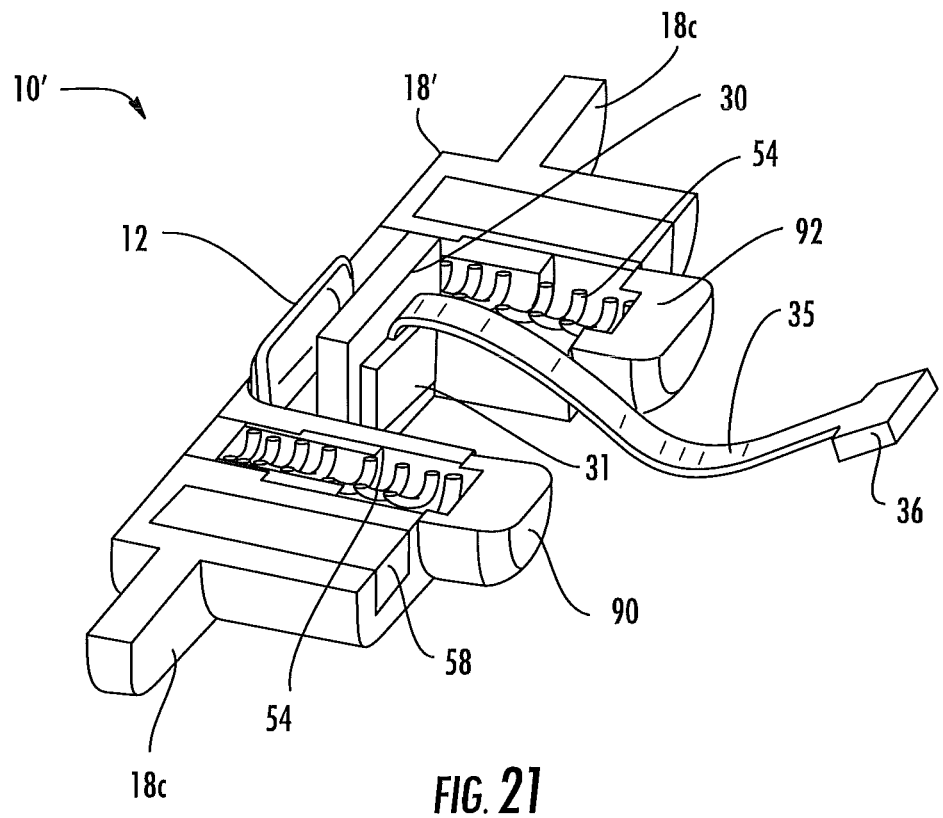
FIG. 21
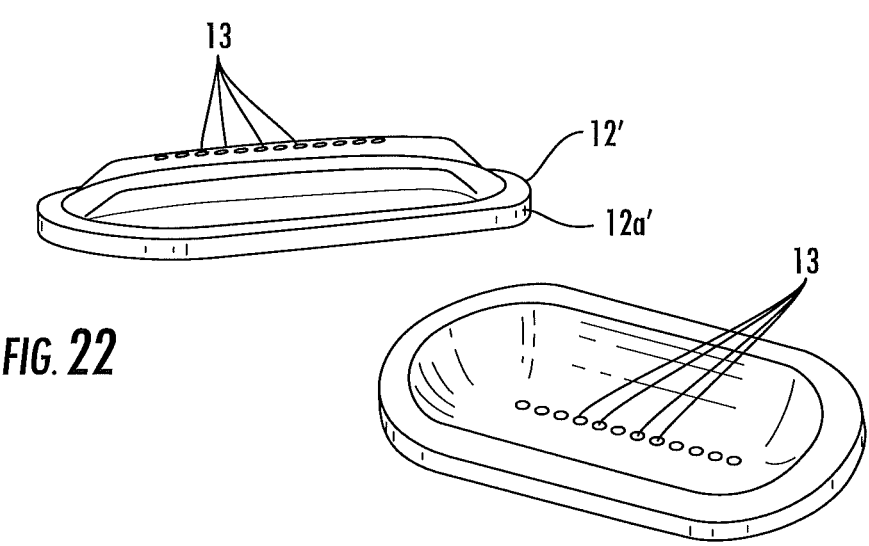
FIG. 22
FIG. 23

OPTICAL PORT HAVING A COVER WITH A MOLDED-IN LENS

PRIORITY

This application claims the benefit of priority under 35 U.S.C. §119 of U.S. Provisional Application Ser. No. 61/737,408 filed on Dec. 14, 2012 the content of which is relied upon and incorporated herein by reference.

FIELD

The disclosure relates generally to optical ports and devices that incorporate the optical port. Specifically, the optical ports and devices disclosed herein provide a cover having a molded-in lens.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime.

Thus, there is an unresolved need for optical ports in consumer devices and other devices that can accommodate the harsh treatment and user environment along with the large number of mating/unmating cycles expected during the lifetime of the device.

SUMMARY

The disclosure is directed to optical ports having a cover with at least one molded-in lens and a mounting body having a recess for mounting the cover to the mounting body along with a mounting surface for securing an optical port. The cover may have a passive alignment feature that cooperates with the alignment feature integrally formed on the mounting body. The optical ports may be used in devices such as consumer devices or the like such as televisions, tablets, phones, etc for providing an optical connection. The molded-in optical lenses of the cover may be aligned with one or more active components for receiving or transmitting the optical signal. The active components may be mounted on a circuit board that may include an electrical tether. In one embodiment, the optical port includes a pocket having an alignment feature such as a piston that is translatable during mating. A magnet may also be secured in the pocket if desired. The optical port may include other features as disclosed herein.

The disclosure is also directed to a device having an optical port. The device includes a frame with a lens opening and an optical port having a mounting body and a cover having at least one molded-in lens. The mounting body has a recess for securing the cover to the mounting body and at least one mounting surface for securing the optical port to the frame. The mounting body is disposed inside the frame so that the at least one molded-in lens is exposed at the lens opening of the frame. The cover may have a passive alignment feature that cooperates with the alignment feature integrally formed on the mounting body. The molded-in optical lenses of the cover may be aligned with one or more active components for receiving or transmitting the optical signal. The active components may be mounted on a circuit board that may include an electrical tether. In one embodiment, the optical port includes a pocket having an alignment feature such as a piston that is translatable during mating. A magnet may also be secured in the pocket if desired. The optical port of the device may include other features as disclosed herein.

Other disclosed embodiments are directed to an optical port for a device where the optical port includes a cover having at least one molded-in lens and a passive alignment feature. The optical port also includes a mounting body having a recess and an alignment feature that is integrally formed on the mounting body for securing the cover to the mounting body along with at least one mounting surface for securing the optical port, a first pocket and a second pocket. The optical port includes one or more active devices attached to the circuit board where the one or more active devices are aligned with the at least one molded-in lens. A first magnet and a second magnet are attached to the mounting body and the first pocket and the second pocket are disposed on opposite sides of the cover with a first alignment feature disposed in the first pocket and a second alignment feature disposed in the second pocket.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 21 is a perspective side cut-away view showing details of the optical port of FIG. 14; and FIGS. 22 and 23 are perspective views showing details of the cover of the optical port of FIG. 14.

DETAILED DESCRIPTION

Figure 1:
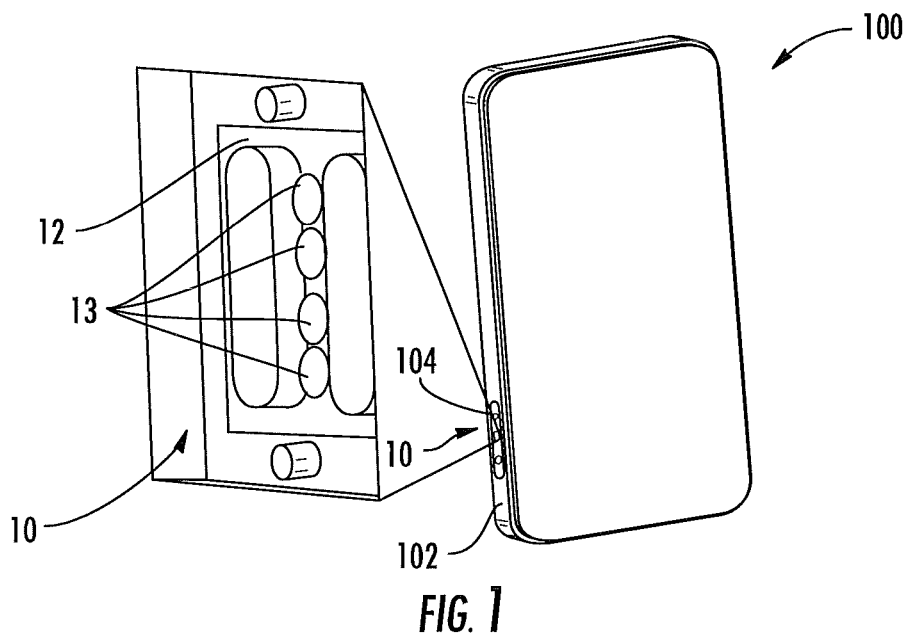
FIG. 1 is a perspective view of a device having an optical port with a cover according to the concepts disclosed herein.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Disclosed are optical ports and devices that incorporate the optical port therein. Specifically, the optical ports and devices disclosed herein use a cover having a molded-in lens for providing a protected and robust footprint where the cover is exposed at an opening on the frame of the device. Thus, the optical port provides a mating surface for engaging a complimentary optical plug that provides a clean and sleek optical port on the device with a relatively small surface that may be cleaned or wiped by the user as necessary. Although, the application shows the optical port secured at an edge of a device it can have any suitable location or arrangement in the device. For instance, the optical port may be located on a large surface such as the bottom of a tablet or a laptop. Further, the optical port can have other alignment and/or retention features than the explanatory features that are discussed herein. Methods for making the optical port and/or device are also disclosed. The optical ports described herein are advantageous since they provide a robust and low-cost solution that addresses the challenges for providing optical ports in consumer devices and other devices.

FIG. 1 is a perspective view of a representative device 100 having an optical port 10 as shown in the detail window according to the concepts disclosed herein. Device 100 may be a smart phone, a tablet, a personnel device assistant (PDA), a data storage device, a laptop or desktop computer, a television, a monitor, or any other suitable device that includes the optical port 10. Device 100 includes a frame 102 having a lens openings 104 on the frame 102 used for locating the optical port 10 to the device 100. Optical port 10 includes a cover 12 having at least one molded-in lens 13. Since the cover 12 is exposed at the frame 102 of device 100 it may be cleaned as necessary by the user and the optical port provides a clean and sleek look for the device. Cover 12 may be formed from any suitable material such as a glass material or a polymer material. Since cover 12 uses molded-in lens that are integrally formed in cover 12 fewer parts are necessary for the optical port 10. As used herein, "frame" may be a sidewall, panel or faceplate of the device and the frame may include one or more pieces/components as desired for the given device.

Other components of optical port 10 may also be optionally exposed at the frame 102 of device 100 as desired. By way of example, one or more alignment features may be exposed at the lens openings on the frame of the device if desired such as shown in optical port 10. Stated another way, the optical port may further include one or more alignment features that are exposed at the outer surface of the device.

Figure 2:
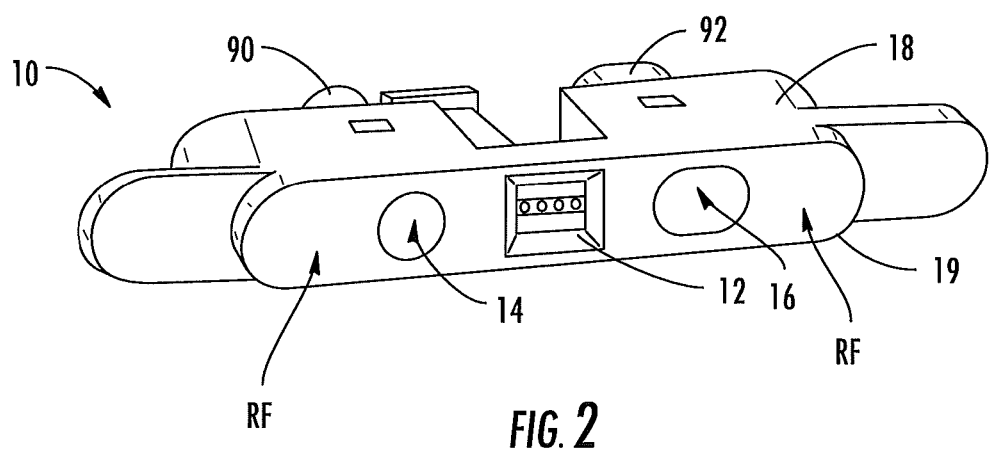
FIG. 2 is a front perspective view of the optical port of FIG. 1.
Figure 3:
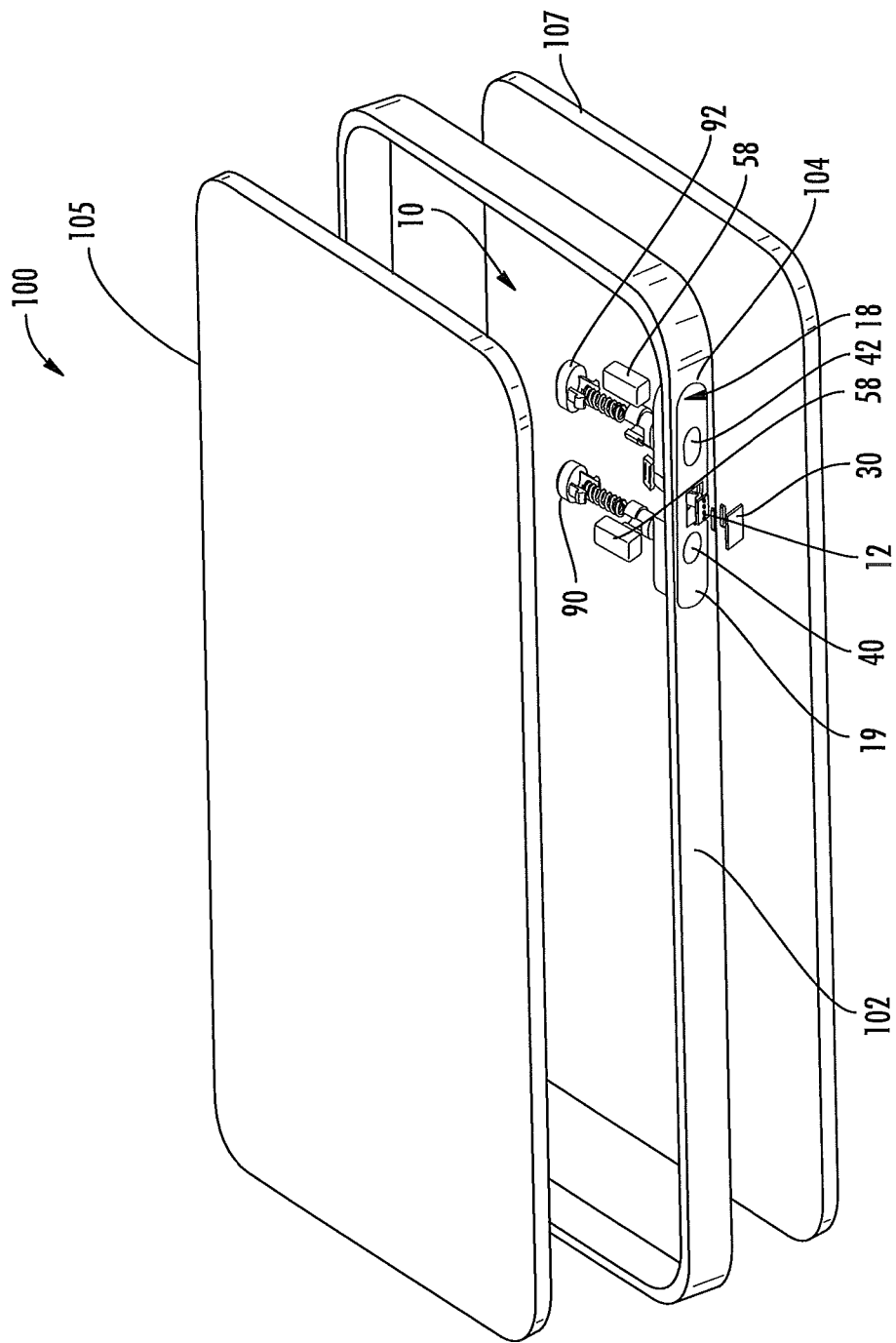
FIG. 3 is a partial exploded perspective view of the optical port in the device of FIG. 1.

FIG. 2 is a front perspective view of optical port 10 removed from device 100. As shown, optical port 10 includes alignment features 14, 16 disposed within a mounting body 18. In this embodiment, alignment features 14, 16 are biased to a forward position and translate rearward when alignment features of a complementary optical plug 220 (FIG. 10) are mated with the optical port 10. As shown in FIG. 3, alignment features 14, 16 are exposed at the lens opening 104 of frame 102 and may translate rearward when the respective alignment features such as protruding pins of a complimentary optical plug (FIG. 10) are mated to the optical port. Consequently, the respective alignment features of the optical port 10 and complimentary optical plug 220 provide alignment between the molded-in lenses 13 of optical port 10 and the optical plug 220 for optical signal transmission therebetween. For instance, the respective alignment features may provide alignment of optical centerlines between the optical port and complimentary optical plug to within 30 microns or less, but other suitable values for molded-in lens 13 to optical element centerline tolerances are possible so long as the insertion loss is acceptable for the application. Additionally, optical port 10 may include one or more suitable retention features RF for maintaining connection between the optical port and the optical plug.

With continuing reference to FIG. 3, optical port 10 is disposed inside the device using a mounting surface 19 on mounting body 18 for locating and securing the optical port to frame 102. Mounting surface 19 is a raised surface that generally conforms with the shape of the lens opening 104 on frame 102 to locate and help secure the optical port 10 to the frame 102. For the purposes of simplicity and clarity to describe the concepts disclosed herein, other structure inside the device 100 besides optical port 10 has been removed and the structure of the device is represented as primitive geometry. In this particular representation, device 100 has a perimeter frame 102 disposed between a top plate 105 and a bottom plate 107. The top plate 105 may be a glass surface such as Corning® Gorilla® Glass available from Corning, Incorporated or the like for providing a display and/or user interface and the bottom plate 107 may be a metal or plastic surface or the like for providing a rigid back surface for protection. However, the concepts of the optical port may be used with other suitable device/frame configurations as desired. By way of example, the bottom plate and perimeter frame may be incorporated as a multi-pieces with a glass surface for the top plate, but other embodiments may use a frame faceplate, panel or the like, instead of having the lens openings 104 formed in a single-piece perimeter frame. As shown, the mounting surface 19 is shaped and configured for providing a flush surface and provide a sleek look for the device when securing the optical port 10 to the frame 102.

Figure 4:
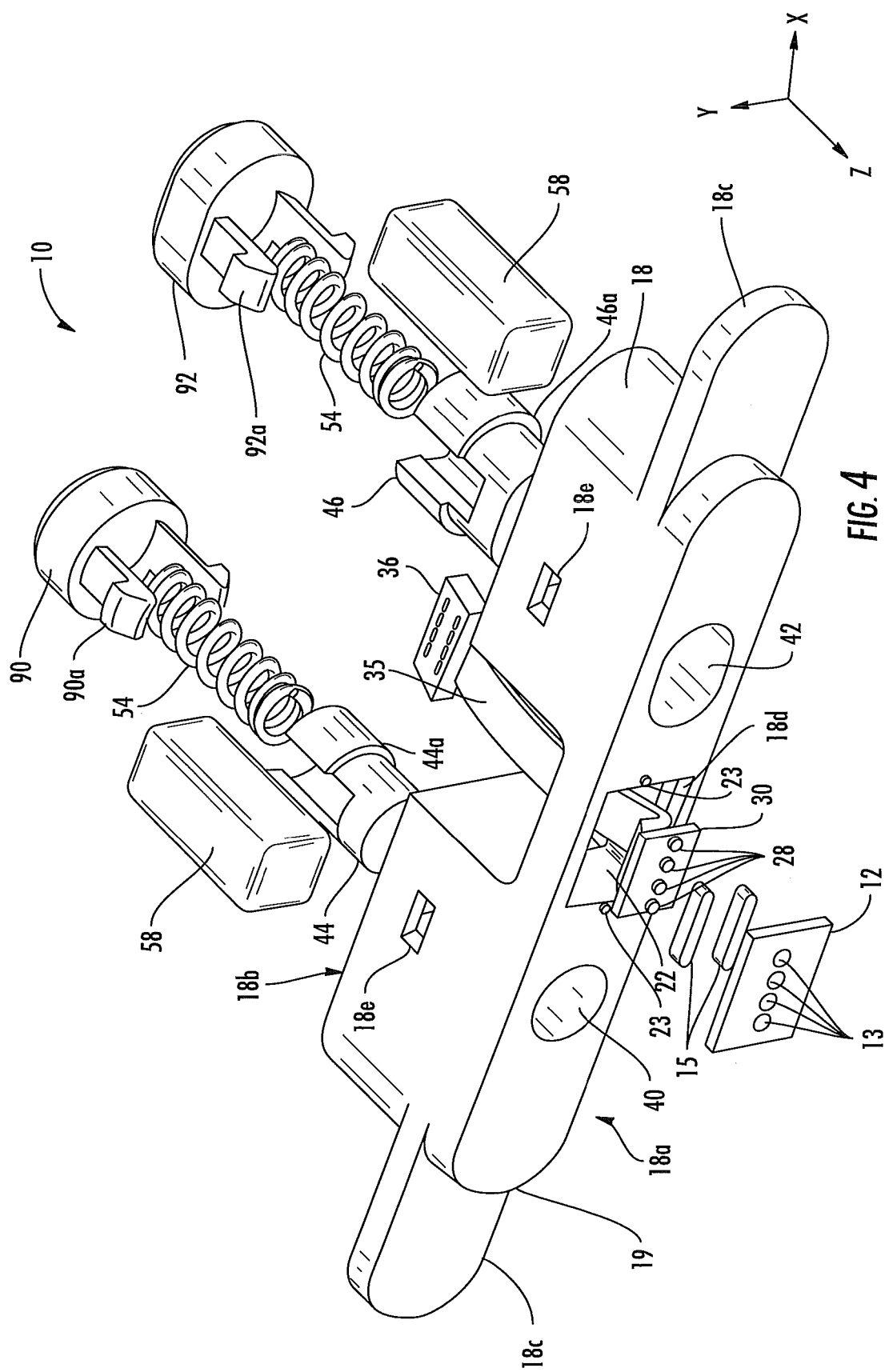
FIG. 4 is a front exploded view of the optical port of FIG. 2.
Figure 5:
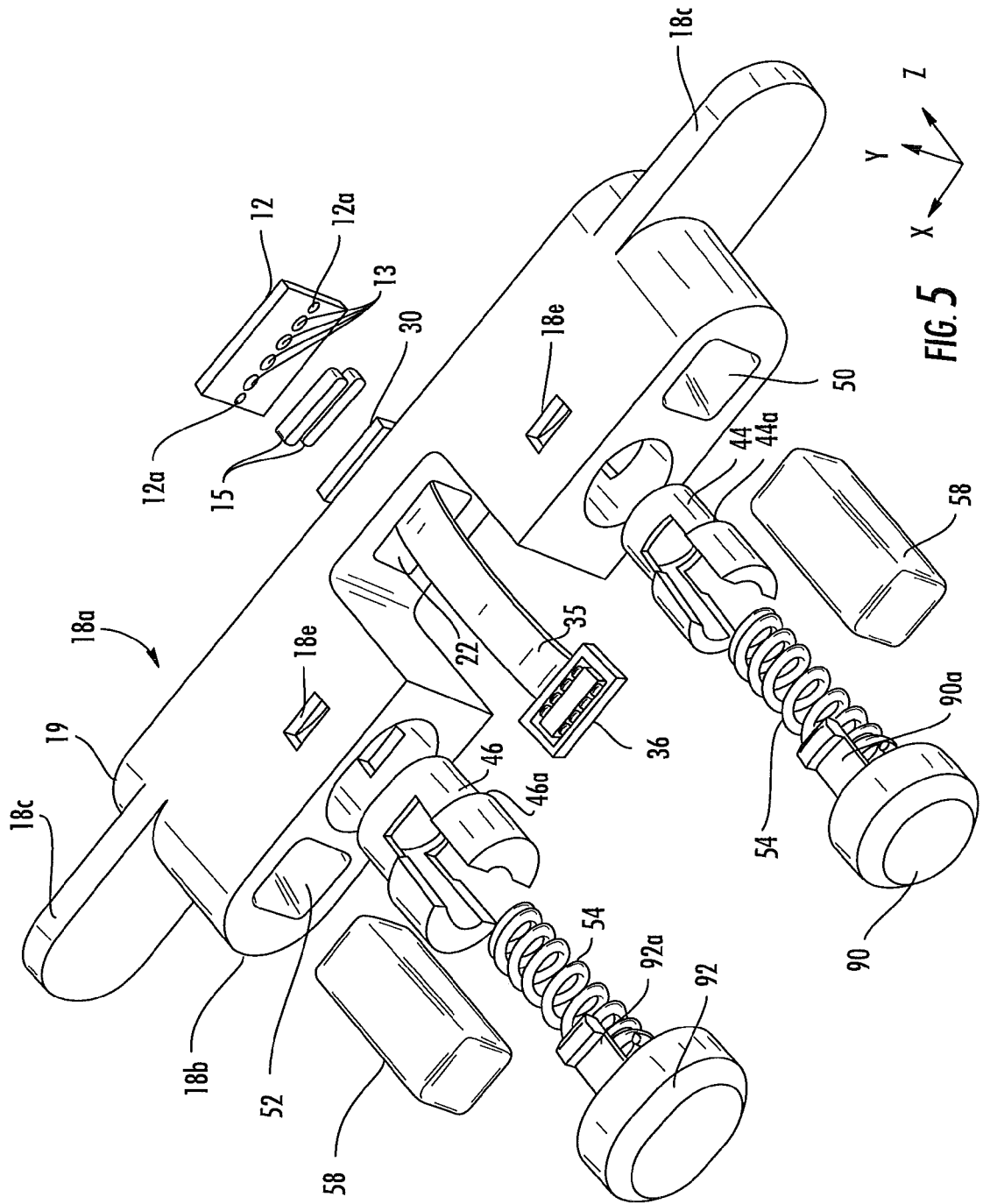
FIG. 5 is a rear exploded view of the optical port of FIG. 2.

FIGS. 4 and 5 are respective front and rear exploded views of the optical port 10 showing details of this particular construction. The explanatory mounting body 18 shown will be discussed in more detail below, but other arrangements or configurations are possible according to the concepts disclosed herein. Stated another way, the mounting body can have any suitable configuration and may be tailored to fit the specific device that the optical port 10 is disposed within. Mounting surface 19 includes a stepped perimeter surface that generally conforms with the shape of opening 104 on frame 102, thereby locating and securing the mounting body to frame 102. However, the mounting surface 19 can have any suitable size and/or shape tailored to the specific device. Mounting body 18 includes a passageway 22 extending from front side 18a to rear side 18b to allow the optical signals to pass from one or more active components 28 to the molded-in lenses 13 on cover 12 and vice versa. As shown best in FIG. 4, passageway 22 includes a recess 18d that is sized and shaped for receiving cover 12 so it fits generally flush with the front side 18a of mounting body 18.

Cover 12 has molded-in lenses 13 having a suitable lens prescription for transmitting/receiving signals from active devices 28. Cover 12 with the molded-in lenses 13 has a generally flat side at the front surface of the cover 12 for mating with a complementary optical plug and a curved lens surface at the rear side of cover 12 (FIG. 5), but other suitable configurations are possible for the cover. The material used for covers disclosed herein should have the desired characteristics such as the desired optical properties, thermal coefficient of expansion (TCE), impact strength, manufacturing properties, low moisture absorption, heat resistance, chemical resistance, or the like. By way of example, the TCE should be about $55\times10^{-6}/°$ C. for maintaining alignment over a range of intended temperatures, but other suitable values are possible and the TCE value of the cover material may be somewhat dependent on the TCE value of other materials used for other components of the optical port such as the mounting body and/or circuit board. As an example, one suitable polymer material is ZEONEX 330R available from Zeon Chemicals L.P. of Louisville, Ky.

Active devices 28 such as photodiode and VCSELs are disposed on circuit board 35 or alternatively disposed on a leadframe and generally precision aligned with the molded-in lenses 13 of cover 12. Specifically, mounting body 18 includes an alignment feature 23 disposed in recess 18d for aligning the cover to the mounting body. More specifically, first and second alignment features 23 are disposed on opposite sides or recess 18d and cooperate with passive alignment features 12a (FIG. 5) that are integrally formed on a rear side of cover 12. Further, the lens prescriptions for the transit and receive channels of the molded-in lenses 13 may be different or the same as desired for providing the desired optical performance. The one or more molded-in lenses 13 of cover 12 are aligned passively and/or actively and referenced relative to the alignment features of the optical port 10. Stated another way, the optical channels of the optical port are in known locations (within allowable tolerances) relative to the alignment feature of the optical port so optical signals may be transferred to a complimentary device with suitable insertion losses for all of the optical channels. Flanges 18c are disposed on distal ends of mounting body 18 and act as a stop for the mounting body relative to an inside surface of frame 102. In this embodiment, a pair of spacers 15 are used on the rear surface of cover 12 for positioning the circuit board 30 at a suitable Z-distance from molded-in lenses 13, however variations are possible for referencing the active components on the circuit board from molded-in lenses. Circuit board 30 may have an electrical tether 35 for transmitting electrical signals through and an optional electrical connector 36 or have leads for soldering as desired for transmitting electrical signals. The circuit board or electrical tether may also include other electronics 31 (FIG. 8) such as transimpedance amplifiers, VCSEL drivers or the like for processing the electrical signals.

As shown, mounting body 18 may also optionally include one or more pockets such as pockets 40,42 or pockets 50,52. The one or more pockets 40 may be used for attaching and/or receiving the desired components or structure of the optical port. By way of explanation, the one or more pockets can include an alignment feature such as a piston or a retention feature such as magnet disposed in the pocket or cavity as desired for the given optical port. As shown, optical port 10 includes a first piston assembly (not numbered) that is received in by a first pocket 40 and a second piston assembly (not numbered) that is received by a second pocket 42 as discussed in more detail below. The first and second pockets 40,42 are located outboard of cover 12 and are exposed to the front side 18a of mounting body 18. Consequently, respective pistons 44,46 are exposed at the device so they can translate within the respective pockets and provide alignment to a complimentary mating optical plug. Other embodiments of optical ports can use other alignment features such as bores (e.g. no pistons) or pins formed in the mounting body; however, bores may collect dirt and debris and pins do not allow a sleek and flush surface, which may not be attractive/desirable to the end user since they can allow damage or inhibit large number of mating cycles. Allowing the pistons to translate to a generally flush position provides a sleek look and design for the optical port/device and inhibits dirt and debris from inhibiting a large number mating cycles and/or damage.

Figure 8:
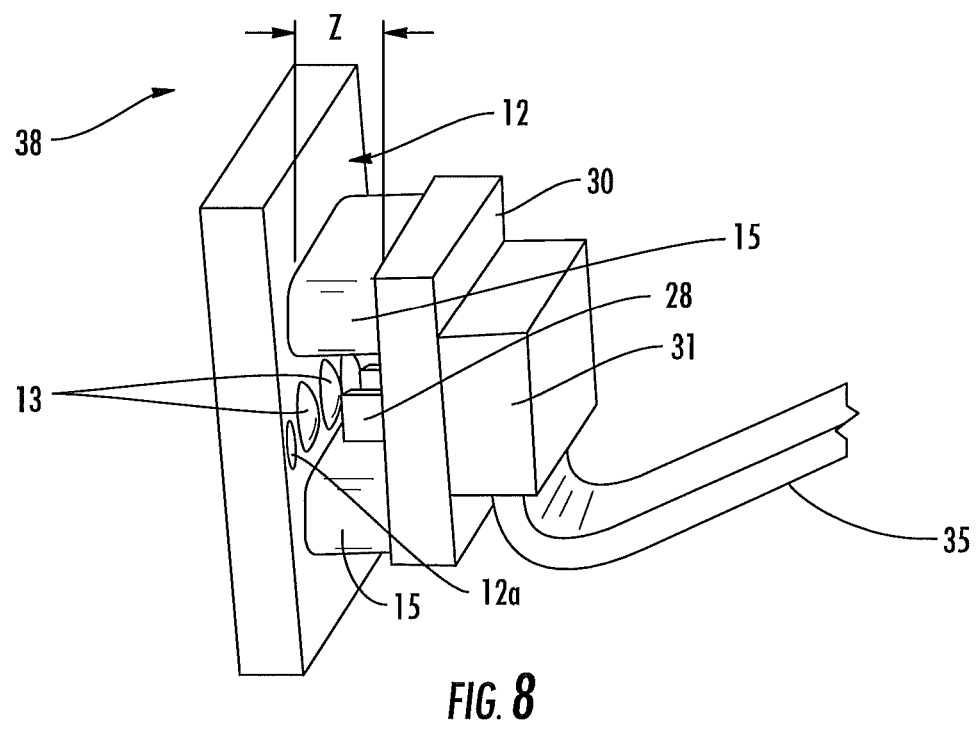
FIG. 8 is a side-view of the sub-assembly of FIGS. 6 and 7 showing details of the construction.

As depicted in FIG. 4, optical port 10 further includes one or more active devices 28 such as photodiodes or VCSELs for receiving or transmitting optical signals to respective molded-in lenses 13 of cover 12. The molded-in lenses 13 are respectively aligned with one or more active devices 28 of the optical port 10 for providing a suitable optical input or output. Generally speaking, the active devices 28 are aligned in the X, Y and Z axes to the molded-in lenses 13 using a passive alignment (e.g., structure such as spacers, ledges, pins and/or bores) and/or active alignment (e.g., active vision alignment) so that a suitable optical signal is either received or transmitted for optical communication. The longitudinal axes of the molded-in lenses 13 are aligned in the X and Y-directions with the active components 28 and offset at a suitable distance in the Z-direction. In this embodiment, one or more spacers 15 are used for providing the offset in the Z-direction. In this embodiment, one or more active devices 28 are disposed on a circuit board 30 that is configured as a portion of a subassembly as discussed herein, but other arrangements are possible according to the concepts disclosed. The circuit board may be attached using an adhesive, UV curable, or other material or the like to inhibit relative movement between active components and the molded-in lenses. The attachment between the circuit board 30 and the mounting body 18 is robust to inhibit movement during rough handling such as impact or shock such as experience when dropping the device or the like. Moreover, the cavity between the active components and the molded-in lens may be closed off or sealed using structure and/or optically transparent materials or the like for inhibiting dust or debris from interfering with signal transmission and further fixing the relative positions therebetween. As discussed above, the circuit board 30 may further include an electrical tether 35 for electrically attaching the active components to a motherboard or the like along with associated electronics 31 (FIG. 8). However, other configurations for transferring the electrical signals are possible depending the structure of the circuit board and/or device and mounting location of the optical port. By way of example, the active devices may be a portion of a lead frame that is secured to the mounting body or the circuit board can attach directly to a board connector, but this may make alignment more difficult.

With continuing reference to FIGS. 4 and 5, the mounting body 18 may include the pocket 40 with an alignment feature 14 disposed in the pocket, where the alignment feature is a first piston 44 that is translatable during mating. Specifically with respect to the explanatory embodiment, mounting body 18 includes a first pocket 40 and a second pocket 42 (i.e., a first group of pockets) disposed on opposite sides of the cover 12 with a first alignment feature 14 disposed in the first pocket 40 and a second alignment feature 16 disposed in the second pocket 42. More specifically, the mounting body 18 of optical port 10 has the first and second alignment features 14,16 that are configured as respective first piston 44 and second piston 46, which are translatable during mating for receiving respective alignment features of a complimentary plug such as alignment pins or the like.

Figure 7:
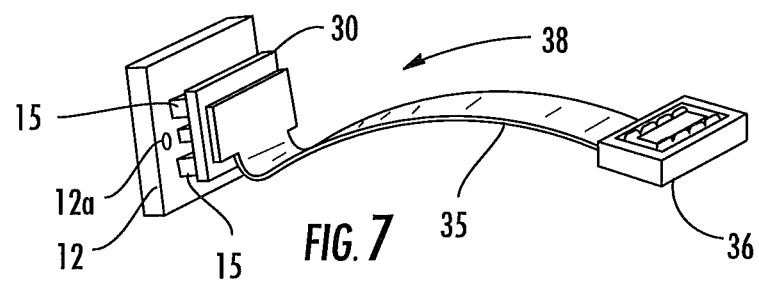

Alignment features may be normally biased to a forward and/or flush position with the frame of the device as desired. By way of example, a suitable resilient member may bias the alignment features forward when the optical port is not mated with a plug, thereby keeping dirt and debris out of the respective pocket or the device. As shown by FIG. 7, the first piston 44 is biased forward by a first resilient member 54 and the second piston 46 is biased forward by a second resilient member 54. As shown, resilient members 54 are coil springs, but any suitable resilient members are possible. Furthermore, the alignment members such as the pistons can have any suitable shape as desired, which may be the same or different shapes. By way of example, the first piston 44 has a first cross-sectional shape (e.g., round) and the second piston 46 has a second cross-sectional shape (e.g. oval) so that the first cross-sectional shape is different than the second cross-sectional shape and provides keying for the optical port 10. Stated another way, the different cross-section shapes for the alignment feature allow only one mating orientation with the plug and provides polarity for the transmit and receive channels. Consequently, pockets 40 and 42 of mounting body 18 have different cross-sectional shapes for receiving the different cross-sectional shapes of pistons 44,46.

As best shown in FIGS. 4 and 5, pistons 44,46 have respective stepped shafts 44a, 44b that acts as a stop for limiting the travel of the pistons in respective pockets 40,42. Likewise, pockets 40,42 have a stepped bore (not numbered) that cooperates with the stepped shaft surface of the pistons 44,46 for limiting the travel of the pistons. For instance, the locations of the stepped surfaces are selected to allow the pistons to be generally flush with the frame of the device when unmated for providing a "clean" looking appearance of the optical port on the device and keep dirt and debris from entering the device. In other embodiments the alignment features/pistons may extend from the frame or be recessed from the frame as desired. Since the pistons and pockets of optical port 10 have stepped profiles the pistons must be inserted into the respective pockets from the rear side 18b of mounting body 18 during manufacture followed by the respective resilient members. Consequently, optical port 10 includes one or more caps 90,92 attached to the rear side 18b of mounting body 18 at the back of pockets 40,42 for trapping and securing the pistons 44,46 and resilient members 54 in the respective pockets 40,42. Moreover, the caps 90 also act as spring pushes to compress the resilient members 54 in the pocket to create a suitable forward biasing force on the alignment members/ pistons. As shown, caps 90,92 include respective arms and locking features 90a, 92a on opposite sides for engaging a plurality of respective windows 18e on mounting body 18, but other methods for attaching caps are possible. Pistons 44,46 are also shown as having cantilever arms (not numbered) and extending rearward so to reduce the contact surface area and friction with the pockets 40,42, but other variations are possible.

In other embodiments, the alignment features/pistons may have the same cross-sectional shapes. This potentially allows the plug to be mated in either orientation, thereby creating a palindromic configuration for the plug and optical port (i.e., the mating can occur in either orientation and still properly transmit traffic between the optical port and plug). However, the alignment features can still have different shapes and allow palindromic configuration by using suitable alignment features on the plug as discussed herein.

As shown, mounting body 18 also includes further optional pockets for receiving an attachment feature therein. In this embodiment, the further optional pockets are a second group of pockets, namely, pockets 50,52 disposed outboard from the first group of pockets 40,42. Pockets 50,52 are used for housing and securing attachment features configured as magnets 58 disposed therein; however, other suitable attachment features are possible using the concepts disclosed herein. As shown, magnets 58 are disposed in the mounting body 18, but behind the frame 102 so that any magnetic debris that is attracted to the magnets does not invade the device, but instead can be wiped away from the frame 102. As shown, the frame faceplate 102a has a reduced wall thickness adjacent to the magnets 58 (and relative to frame perimeter 102a) for decreasing the distance of magnetic attraction and increasing the magnetic force for complementary plug attraction. Although pockets 50,52 of mounting body 18 are shown with open ends at the rear side 18b (FIG. 5), one or more ends of the pockets may be closed or the magnets may be encapsulated in the mounting body as desired. In this embodiment, the magnets 58 can have a friction fit with the mounting body and/or use an adhesive for attaching the magnet in mounting body 18. In still other embodiments, the attachment/retention features may be separate from the optical port such as attached directly to the frame or the like.

Figure 6:
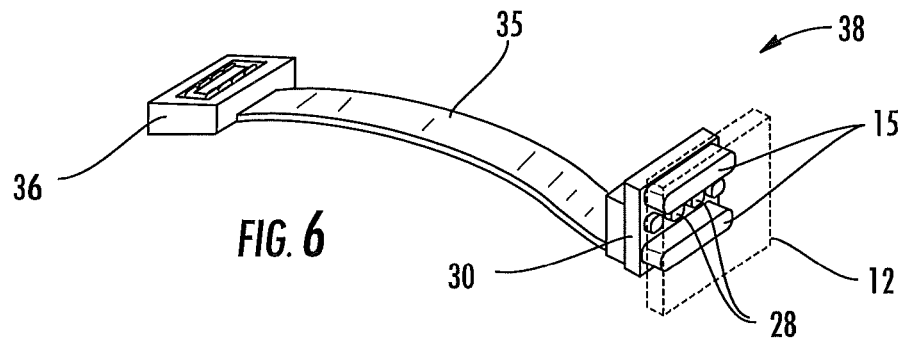
FIGS. 6 and 7 respectively are front and rear perspective views of a sub-assembly of FIGS. 4 and 5.

FIGS. 6 and 7 respectively are front and rear perspective views of an optical interface sub-assembly 38 and FIG. 8 is a side-view of the optical interface sub-assembly 38 showing details of the construction. Generally speaking, the components of sub-assembly 38 are assembled in a separate operation and then the sub-assembly 38 is secured to the mounting body 18 using cover 12 by securing cover 12 into recess 18d using passive alignment features 12a. Thus, the optical alignment between the molded-in lenses 13 and active components 28 can be performed prior to the placement of the sub-assembly 38 relative to the alignment features 14,16 of optical port 10. Specifically, sub-assembly 38 is positioned and secured to mounting body 18 by routing the electrical tether 35 through passageway 22 from the front side 18a of mounting body 18 so that passive alignment features 12a integrally formed on a rear surface of cover 12 align and engage first and second alignment features 23 disposed on opposite sides or recess 18d. Although, passive alignment features 12a are shown as blind bores and first and second alignment features 23 are shown as round pins, other structures are possible such as protrusions and openings shaped as crosses or the like that allow some adjustment in the alignment. Further, the alignment features 23 may have a slight taper to the pins for receiving an adhesive or the like, while still maintain a precision fit. Cover 12 may be sealed to the recess and/or the cavity may be potted with an optical transparent material to the wavelengths to inhibit contamination and/or shifting of parts due to mechanical shocks like the device being dropped. The passive alignment feature 12*a* and alignment features 23 positions and aligns the molded-in lens 13 to the alignment features 14,16 to within about 30 microns or less so that a suitable insertion loss is maintained with the optical plug, but other dimensions are possible if a suitable insertion loss is maintained.

This construction of the sub-assembly 38 and the optical port 10 are advantageous since the two sub-assemblies can be manufactured independently and then combined at any suitable point in the assembly process of optical port 10 or device 100, thereby providing manufacturing flexibility and reducing product cycle time. A suitable method for making sub-assembly 38 includes the steps of placing the active components 28 onto the circuit board 30 using a suitable alignment technique. One suitable alignment technique for placing the active components 28 is a vision alignment system as known in the art, but other techniques are possible. One or more spacers 15 are attached to the circuit board 30 for creating the desired distance in the Z-direction. Then, the active components 28 are aligned with the molded-in lenses 13 on cover 12 and then the cover 12 is secured to spacers 15. The alignment of the molded-in lens 13 with the active component uses a suitable vision alignment system as known in the art, but other techniques are possible for alignment. Thereafter, sub-assembly 38 is attached to the mounting body 18 as discussed above at a suitable point in the manufacturing process. Of course, the method for making sub-assembly 38 may have other steps as desired.

Figure 9:
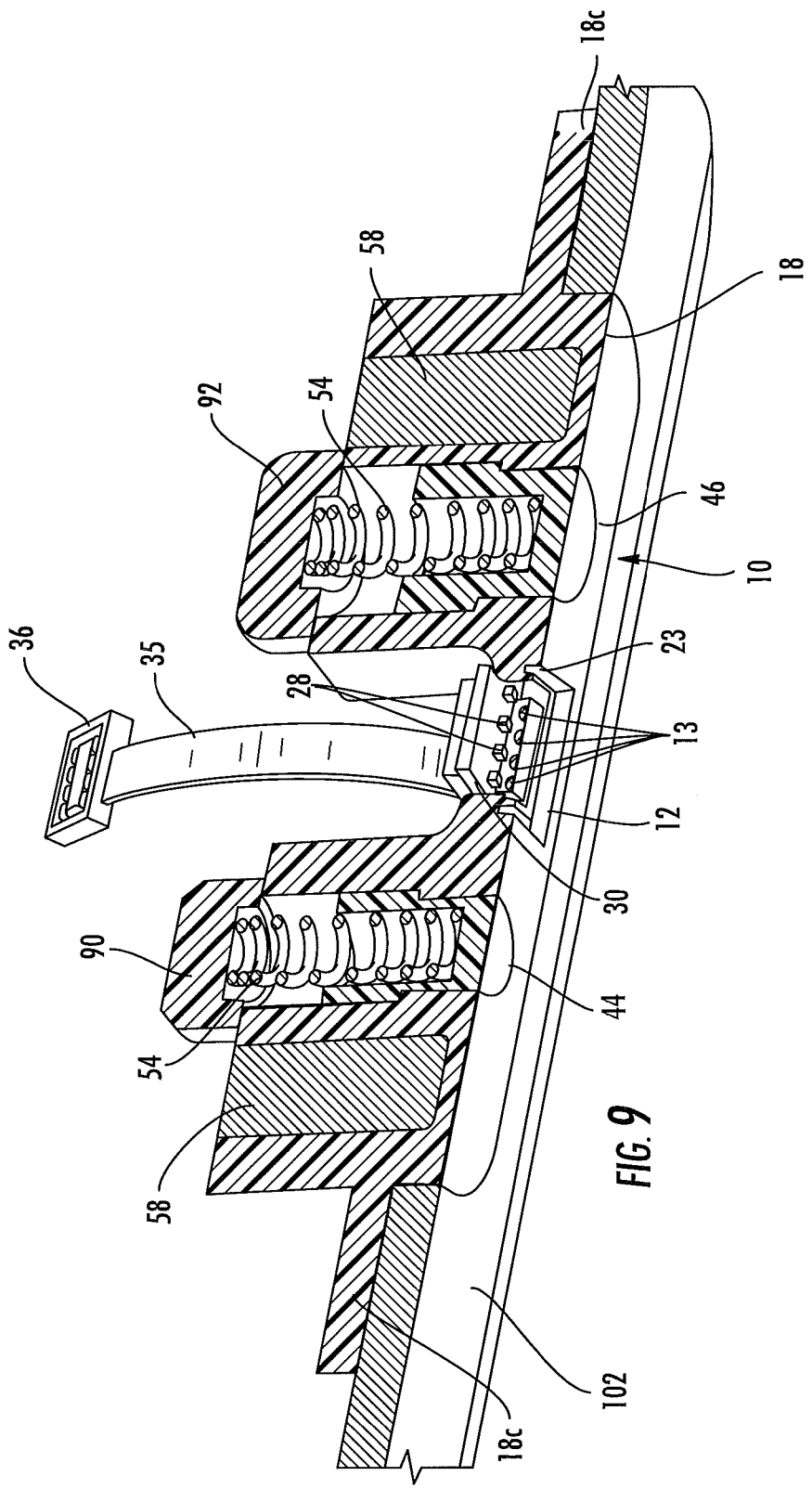
FIG. 9 is a cut-away view showing details of the assembled optical port of FIG. 2 as a portion of a device having a frame.

FIG. 9 is a cutaway assembled perspective view showing the details of the optical port 10 disposed in device. As discussed, optical port 10 includes mounting body 18 and a cover 12 for communicating an optical signal(s) to an optical cable assembly (FIGS. 10-12) or the like that is mated to the optical port 10. Mounting body 18 is disposed inside frame 102 of device 100 so that the one or more molded-in lenses 13 of cover 12 are exposed at the lens opening 104 of frame 102 for providing a sleek footprint. As shown, the mounting surface 19 of the mounting body 18 extends into the frame wall (not numbered) so that it has a generally flush fit with the outer surface of frame 102. Generally speaking, integrally forming the lenses in cover 13 reduces the part count of the optical port.

Figure 10:
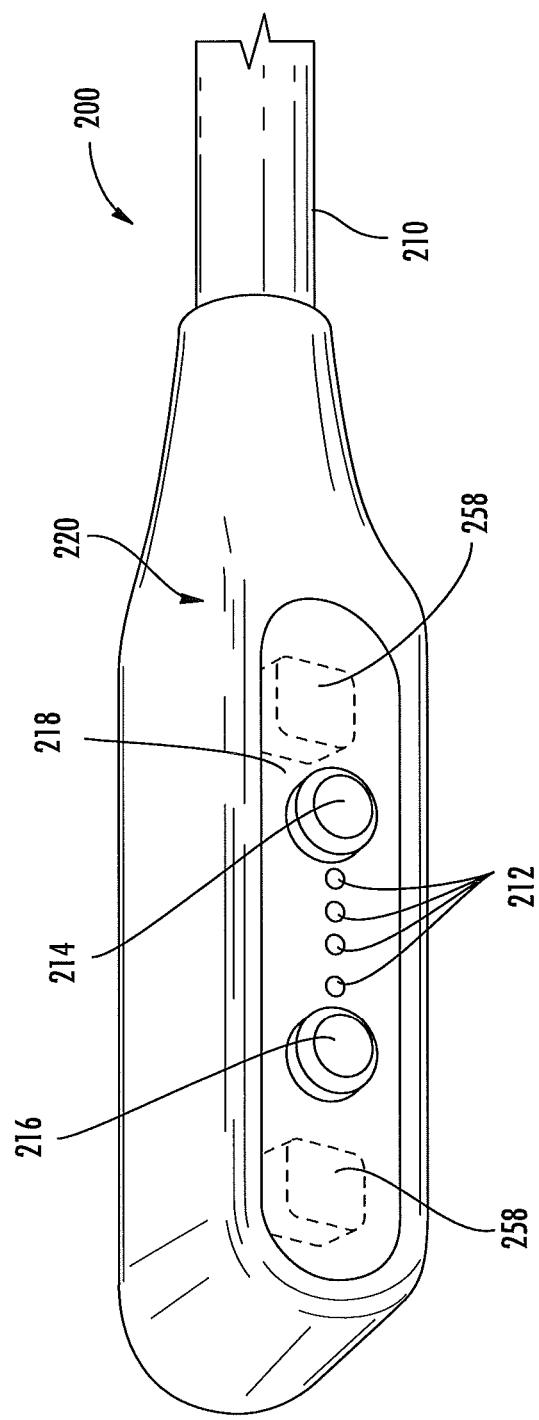
FIG. 10 is a perspective view showing the mating portion of an explanatory complimentary optical plug for mating with the optical port on the device of FIG. 1.

FIG. 10 is a perspective view showing the mating portion of an explanatory optical cable assembly 200 having a complimentary optical plug 220 attached to an optical fiber cable 210 for mating with optical port 10. Optical plug 220 includes a first alignment feature 214 and a second alignment feature 216 configured as alignment pins disposed on opposite sides of optical plug optical elements 212. Optical plug optical elements 212 have a suitable spacing and arrangement for aligning with the molded-in lenses 13 of cover 12 of optical port 10 when mated for transmitting optical signals. In this embodiment, optical plug 220 has alignment features 214, 216 with the same cross-sectional size and shape (e.g. round) that extend from the optical plug mating surface (not numbered). In this embodiment, the alignment features are integrally formed with an optical plug body 218; however, the alignment feature may be discrete components if desired.

Optical plug body 218 is preferably formed from a suitable optically transmissive material such as a suitable Ultem® material that has optical elements 212 integrally formed therein, but other configurations are possible.

Even though the alignment features have the same round shape, the optical plug 220 still mates with optical port 10 using the round and oval shaped translatable pistons (e.g. circle and oval slot arrangement) since alignment feature 214 provides positional alignment (e.g., round to round mating) and alignment feature 216 provides rotational alignment (e.g., round to oval slot mating). Thus, a high-precision molded part is not required for alignment of the molded-in lenses 13 with the optical elements 212 since alignment feature 216 has a lateral tolerance within the oval-shaped alignment feature of optical port 10. Moreover, using two round alignment features 214,216 for optical plug 220 allows palindromic mating if desired. Of course, optical plug 220 may use alignment features having two different cross-sectional shapes for keying the optical plug 220 to optical port 10 so that it only mates in one orientation; however, a higher-degree of precision may be required for the part.

Figure 12:
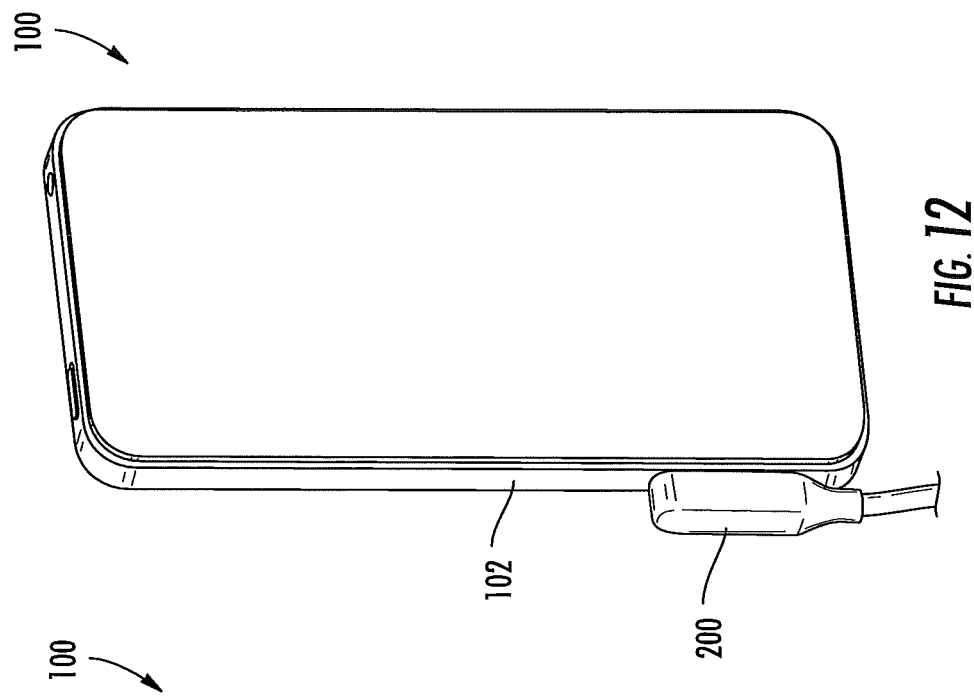
FIGS. 11 and 12 are perspective views showing the alignment and mating of the optical plug of FIG. 10 with the optical port on the device of FIG. 1.
Figure 11:
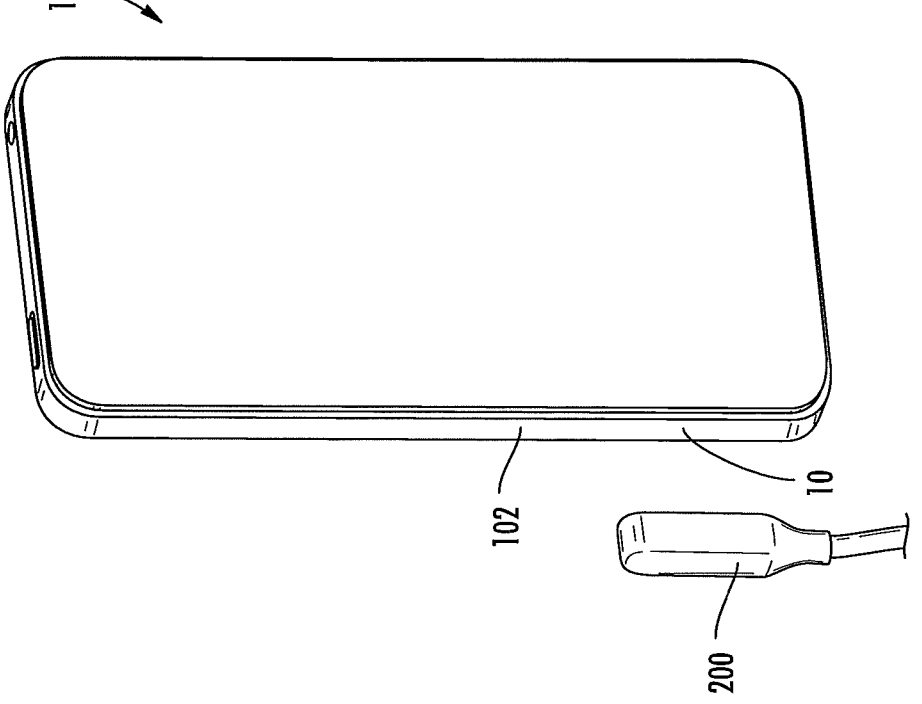

Optical plug 220 also includes magnets 258 with the opposite polarity of the magnets in the optical port 10 for retention during mating. Additionally, magnets 258 are recessed from the mating surface of the plug so that ferrous debris may be easily be removed or cleaned from the optical plug mating surface. FIGS. 11 and 12 are perspective views showing the alignment and mating of the cable assembly 220 with the optical port 10 on device 100.

Figure 13:
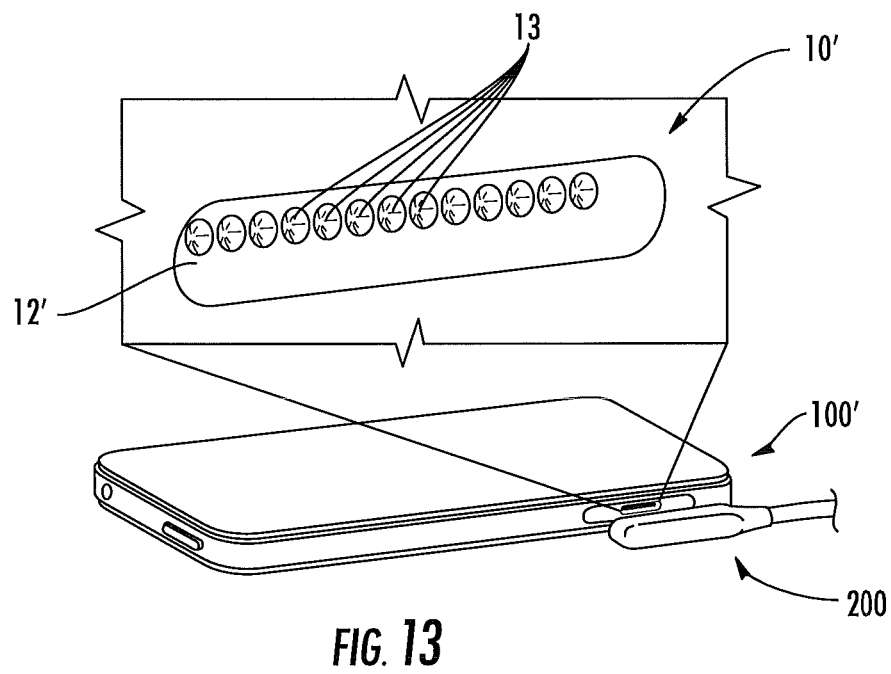
FIG. 13 is a perspective view of another device having an alternate optical port with a cover according to the concepts disclosed herein.

Although, optical port 10 has cover 12 configured as a flat structure at the front side of the mounting body, other configurations for the cover and/or mounting body are possible. For instance, the cover may be configured as a non-flat structure such as a curved cover. Additionally, the cover may be secured in a recess having a location other than the front side of the mounting body. For example, FIG. 13 is a perspective view of another device 100' having an optical port 10' showing the alignment with a complimentary optical plug before mating. Optical port 10' is similar to optical port 10, but uses a cover 12' having a non-flat shape and secured to a recess 18*d* formed on a rear side 18*b* of a mounting body 18' as discussed herein. Like device 100, device 100' includes a frame 102 having a lens openings 104 on the frame 102 used for locating the optical port 10' to the device 100'. Optical port 10' includes a cover 12' having at least one molded-in lens 13. Since the cover 12' is exposed at the frame 102 of device 100 it may be cleaned as necessary by the user and the optical port provides a clean and sleek look for the device. Cover 12' may be formed from any suitable material such as a glass material or a polymer material as discussed herein. Since cover 12' uses molded-in lens that are integrally formed in cover 12 fewer parts are necessary for the optical port 10'. For the sake of brevity, certain structure and/or elements of optical port 10' will not be discussed since they are substantially similar structure and/or elements of optical port 10 as discussed herein.

Figure 14:
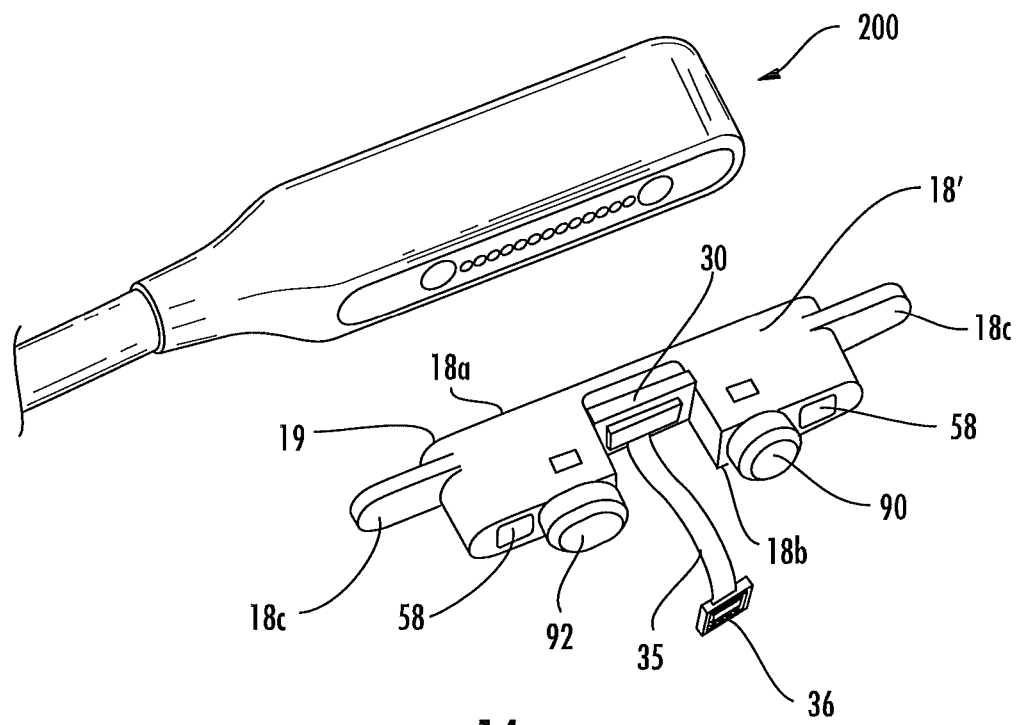
FIG. 14 is a rear perspective view of the optical port of FIG. 13 showing the alignment with a complimentary optical plug before mating.
Figure 15:
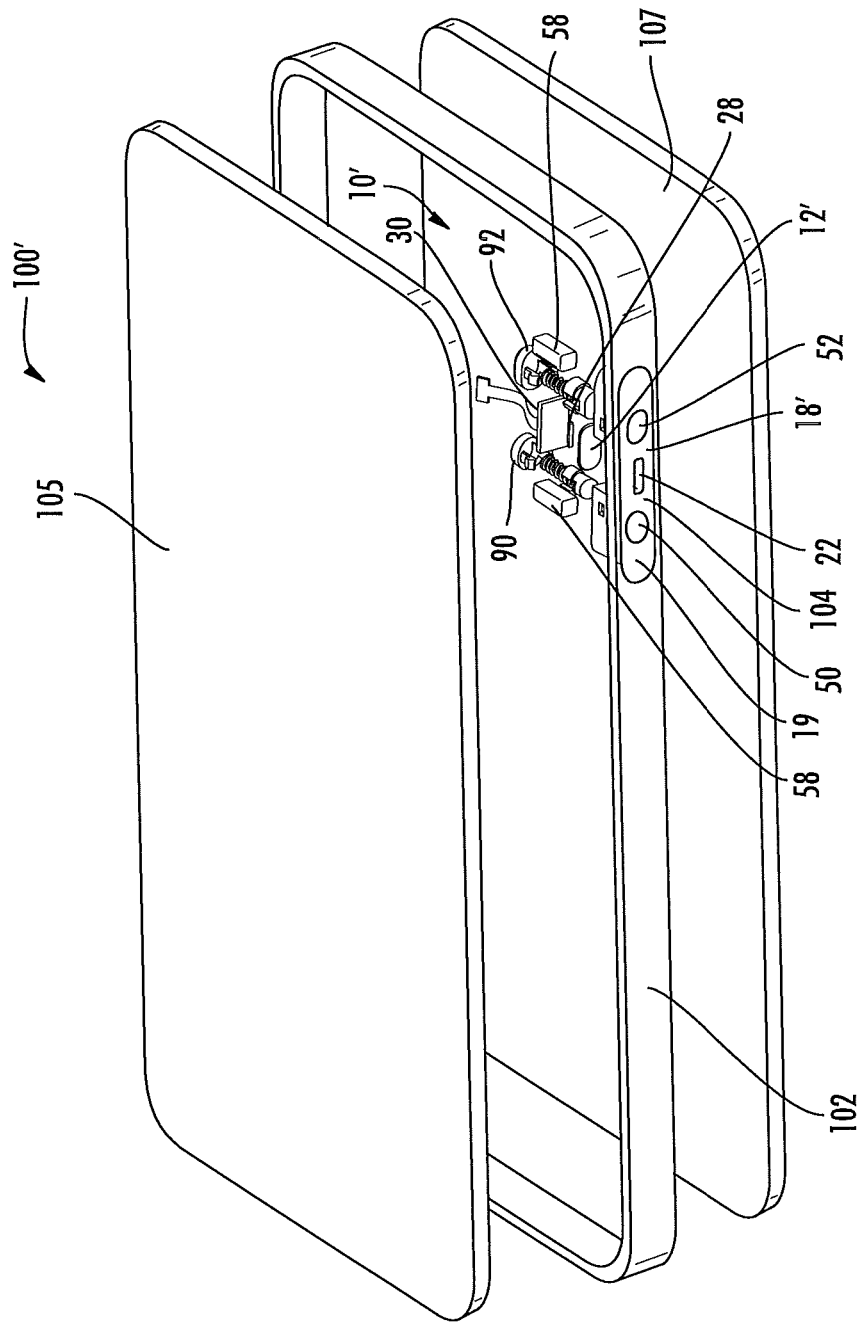
FIG. 15 is a partial exploded perspective view of the optical port in the device of FIG. 13.

FIG. 14 is a rear perspective view of assembled optical port 10' showing the alignment with a complimentary optical plug 200 in preparation for mating and FIG. 15 is a partially exploded view of the optical port 10' in device 100'. Mounting body 18' includes a mounting surface 19 configured as a raised surface that generally conforms with the shape of the lens opening 104 on frame 102 to locate and help secure the optical port 10' to the frame 102. For the purposes of simplicity and clarity to describe the concepts disclosed herein, other structure inside the device 100' besides optical port 10' has been removed and the structure of the device is represented as primitive geometry.

Figure 16:
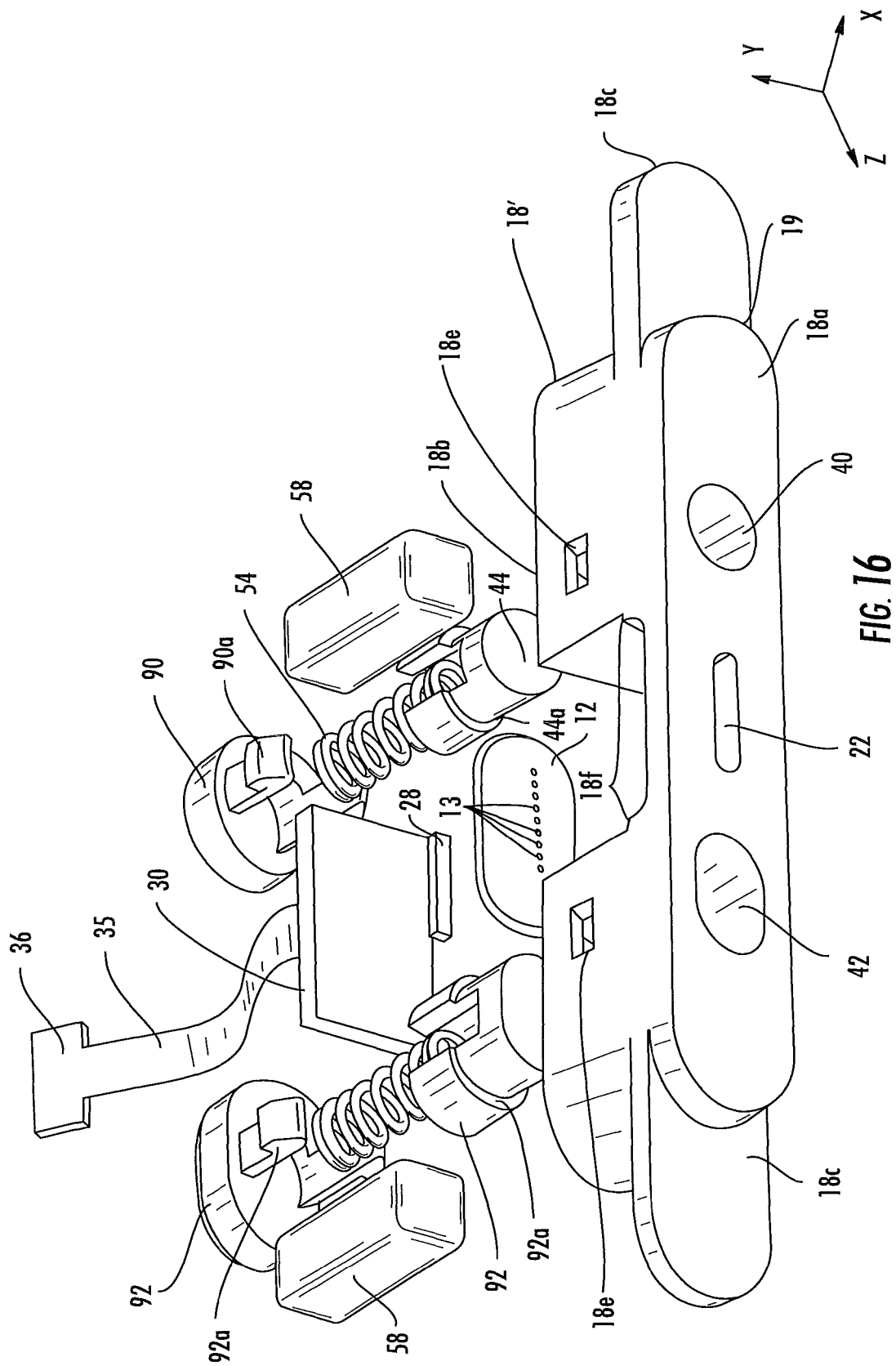
FIG. 16 is a front exploded view of the optical port of FIG. 14.
Figure 17:
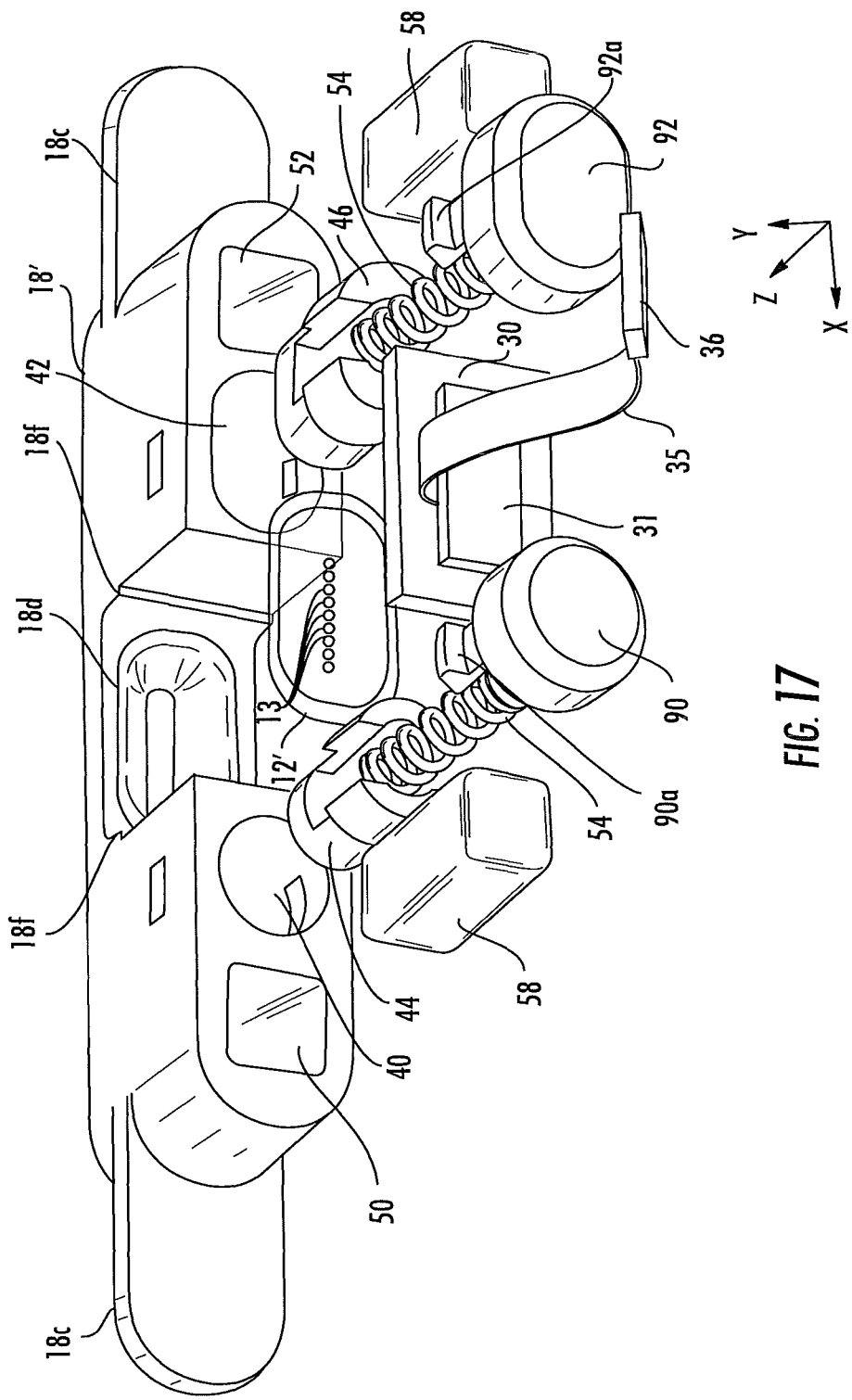
FIG. 17 is a rear exploded view of the optical port of FIG. 14.

FIGS. 16 and 17 are respective front and rear exploded views of the optical port 10'. As shown, mounting body 18' of optical port 10' is different than mounting body 18 of optical port 10 since cover 12' is secured to mounting body 18' in a recess 18d disposed at a rear side 18b of mounting body 18'. Moreover, since cover 12' is secured in recess 18d at the rear side 18b of mounting body 18' the cover 12' has a non-flat or curved shape so that the molded-in lenses 13 extend forward toward a front side 18a of mounting body 18' when the cover is secured to mounting body 18' Stated another way, cover 12' is shaped to extend to a surface of the device 100'. Cover 12' is best shown in FIGS. 22 and 23 and includes a flange 12a as depicted. Covers disclosed herein may have any suitable number of molded-in lenses 13 and cover 12' shows twelve molded-in lenses as depicted.

Figure 18:
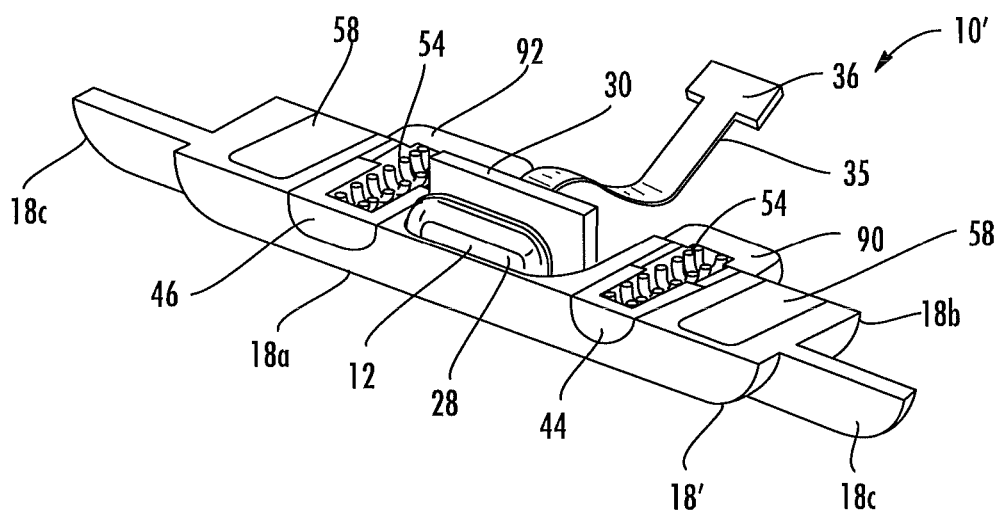
FIGS. 18 and 19 respectively are a perspective cut-away and plan view showing details of the optical port of FIG. 14.
Figure 19:
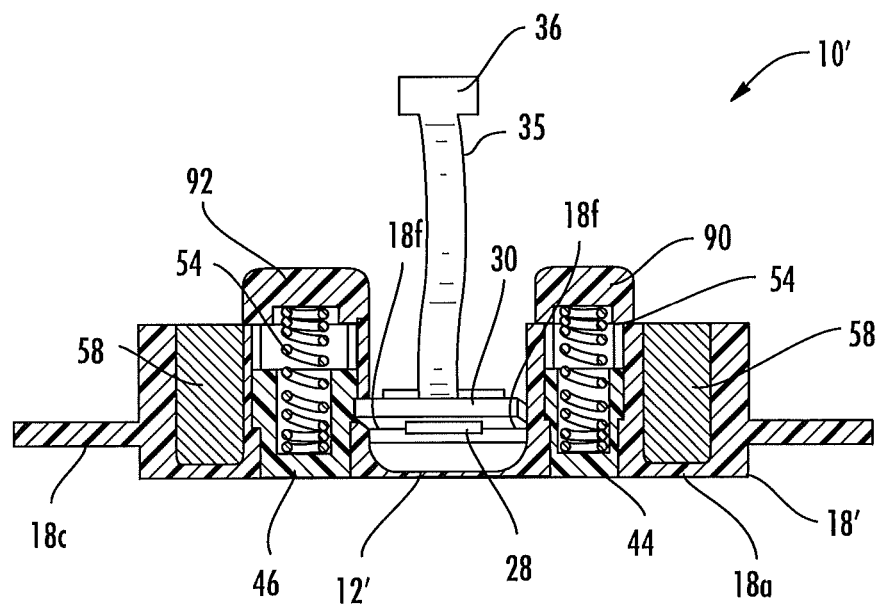
Figure 20:
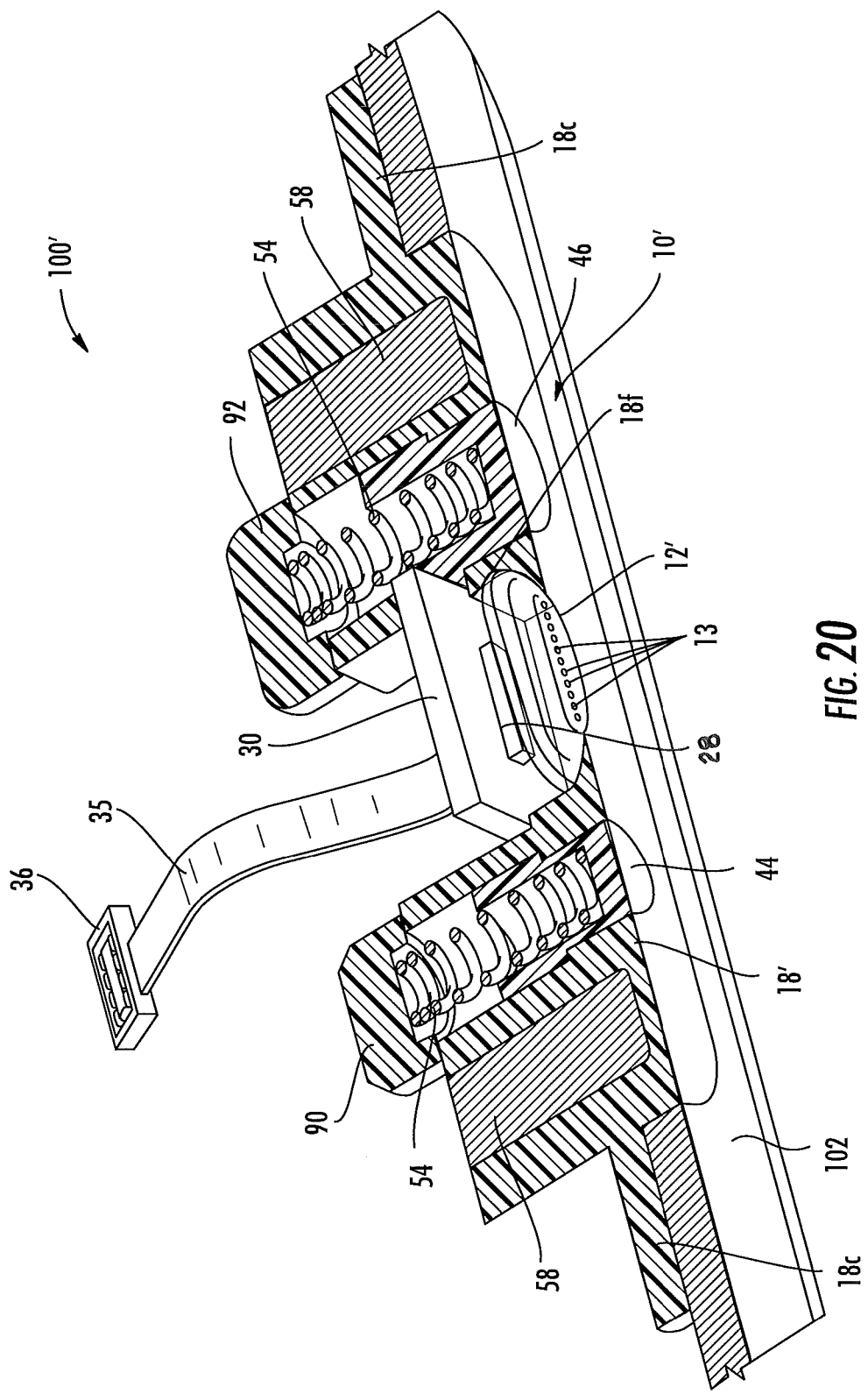
FIG. 20 is a cut-away view showing details of the assembled optical port of FIG. 14 as a portion of a device having a frame.

FIGS. 18 and 19 respectively are perspective cut-away and plan views showing details of the optical port 10' when assembled and FIG. 20 is a cut-away view showing details of the optical port 10' assembled in device 100'. FIG. 21 is a perspective side cut-away view showing details of the optical port 10'. Optical port 10' uses flange 12a of cover 12' and corresponding recess 18d for positioning the cover 12' relative to mounting body 18' and the respective alignment features (e.g., pistons 90 and 92). Further, the attachment of circuit board 30 is different in optical port 10'. Specifically, circuit board 30 is attached directly to one or more ledges 18f for positioning active components 28 at a suitable Z-distance from molded-in lens 13 of cover 12' as shown, thereby eliminating the need for one or more spacers such as used for optical port 10. Further, the active components 28 may be aligned in the X and Y directions using suitable techniques to create the desired tolerance. FIGS. 22 and 23 are perspective views showing details of the cover 12' with molded-in lens 13 and flange 12a.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical port for a device, the optical port comprising: a cover having at least one molded-in lens; and a mounting body having a recess for securing the cover to the mounting body, and at least one mounting surface for securing the optical port to the device, the mounting body having a first pocket with at least one of a first alignment feature and a magnet disposed in the first pocket, wherein the first alignment feature includes a piston that is translatable during mating, wherein:
   the cover has a passive alignment feature that cooperates with a body alignment feature that is integrally formed on the mounting body;
   the at least one molded-in lens is aligned with one or more active devices of the optical port; and
   the one or more active devices are disposed on a circuit board, wherein the circuit board is attached to the mounting body or attached to one or more spacers secured to the cover.

2. The optical port of claim 1, the cover being formed from a glass material or a polymer material.

3. The optical port of claim 1, the recess being formed on one of a rear side and a front side of the mounting body, wherein the rear side is disposed opposite the front side, and wherein the front side is externally facing and exposed when the optical port is secured to the device.

4. The optical port of claim 1, the at least one molded-in lens being spaced apart from the one or more active devices of the optical port, wherein the at least one molded-in lens are axially optically accessible through the recess when the cover is secured to the mounting body.

5. The optical port of claim 1, wherein the circuit board further includes an electrical tether.

6. The optical port of claim 1, the mounting body having at least a pair of pockets.

7. The optical port of claim 1, the mounting body further having a second pocket, wherein the first pocket and the second pocket are disposed on opposite sides of the cover with the first alignment feature disposed in the first pocket and a second alignment feature disposed in the second pocket, wherein the first and second alignment features including a respective first piston and second piston that are translatable during mating.

8. The optical port of claim 7, the first piston having a first cross-sectional shape and the second piston having a second cross-sectional shape, wherein the first cross-sectional shape is different than the second cross-sectional shape.

9. The optical port of claim 7, the first piston being biased forward by a first resilient member and the second piston being biased forward by a second resilient member.

10. The optical port of claim 1 being a portion of a device having a frame, wherein the mounting body is disposed inside the frame and so that the at least one molded-in lens is exposed at the opening of the frame.

11. The device of claim 10, wherein the frame further includes one or more alignment feature openings.

12. The optical port of claim 1, the passive alignment feature is one of a bore and a protrusion and the body alignment feature is the other of the bore and the protrusion.

13. The optical port of claim 1, the cover forming a convex shape wherein the at least one molded-in lens is spaced apart from an outer flange of the cover.

14. The optical port of claim 1, the recess defining an enclosed perimeter.

15. The optical port of claim 1, wherein the mounting surface conforms to the shape of an opening defined by an outer wall of the device.

16. The optical port of claim 15, wherein frame includes the outer wall of the device and the opening, and wherein the mounting body is disposed inside the frame such that a front side of the at least one mounting surface is flush with the outer wall of the device, and wherein the cover is flush with the front side of the mounting body when secured to the mounting body.

17. The optical port of claim 1, wherein the at least one mounting surface includes a stepped perimeter surface.

18. A device having an optical port, comprising:
   a frame having an outer wall defining a lens opening; and
   the optical port having a mounting body, at least one mounting surface for securing the optical port to the frame, and a cover having at least one molded-in lens, the mounting body having a recess for securing the cover to the mounting body, the mounting body further including a first pocket with a first alignment feature disposed in the pocket, wherein the first alignment feature including a piston that is translatable during mating, wherein the mounting body is disposed inside the frame so that the at least one molded-in lens is exposed at the lens opening of the frame, wherein:

the cover has a passive alignment feature that cooperates with a body alignment feature that is integrally formed on the mounting body;

the at least one molded-in lens is aligned with one or more active devices of the optical port; and the one or more active devices are disposed on a circuit board, wherein the circuit board is attached to the mounting body.

19. The device of claim 18, the cover being formed from a glass material or a polymer material.

20. The device of claim 18, the recess being formed on a rear side of the mounting body, wherein the rear side is disposed opposite a front side that is externally facing and exposed when the optical port is secured to the frame, and wherein the cover forms a convex shape such that the at least one molded-in lens is spaced apart from an outer flange of the cover and the at least one-molded in lens is spaced apart from the one or more active devices of the optical port.

21. The device of claim 18, the recess being formed on a front side of the mounting body, wherein the front side is disposed opposite a rear side of the mounting body, and wherein the front side is externally facing and exposed when the optical port is secured to the frame.

22. The device of claim 18, the optical port further including one or more alignment features and the frame further including one or more alignment feature openings for receiving the one or more alignment features.

23. The device of claim 18, wherein the circuit board further includes an electrical tether.

24. The device of claim 18, the mounting body further including at least a pair of pockets.

25. The device of claim 18, the mounting body further including a pocket with a magnet disposed in the pocket.

26. The device of claim 18, the mounting body further including a second pocket, wherein the first pocket and the second pocket are disposed on opposite sides of the cover with the first alignment feature disposed in the first pocket and a second alignment feature disposed in the second pocket, wherein the first and second alignment features including a respective first piston and second piston that are translatable during mating.

27. The device of claim 26, wherein the first piston has a first cross-sectional shape and the second piston has a second cross-sectional shape, wherein the first cross-sectional shape is different than the second cross-sectional shape.

28. The device of claim 26, the first piston being biased forward by a first resilient member and the second piston being biased forward by a second resilient member.

29. The device of claim 18, wherein the recess defines an enclosed perimeter, the cover is flush with one of a front side and a rear side disposed opposite the front side of the mounting body when the cover is secured to the mounting body, and a front side of the mounting surface is flush with the outer wall of the frame when the mounting body is disposed inside the frame.

30. The device of claim 18, wherein the at least one mounting surface conforms to the shape of the lens opening.

31. An optical port for a device, the optical port comprising:

a cover having at least one molded-in lens, the cover having a passive alignment feature;

a mounting body having a recess for securing the cover to the mounting body, at least one mounting surface for securing the optical port to the device, a first pocket, a second pocket, and an alignment feature that is integrally formed on the mounting body and that cooperates with the passive alignment feature of the cover to secure the cover to the mounting body;

one or more active devices attached to a circuit board, wherein the circuit board is attached to the mounting body, wherein the one or more active devices are aligned with and spaced apart from the at least one molded-in lens;

a first magnet and a second magnet attached to the mounting body; and wherein the first pocket and the second pocket of the mounting body are disposed on opposite sides of the cover with a first alignment feature disposed and translatable in the first pocket and a second alignment feature disposed and translatable in the second pocket.

32. The optical port of claim 31, the cover being formed from a glass material or a polymer material.

33. The optical port of claim 31, the recess being formed on a rear side of the mounting body, wherein the rear side is disposed opposite a front side that is externally facing and exposed when the optical port is secured to the device, and wherein the cover forms a convex shape such that the at least one molded-in lens is spaced apart from an outer flange of the cover.

34. The optical port of claim 31, the recess being formed on a front side of the mounting body, wherein the front side is disposed opposite a rear side of the mounting body, and wherein the front side is externally facing and exposed when the optical port is secured to the device.

35. The optical port of claim 31, wherein the circuit board further includes an electrical tether.

36. The optical port of claim 31, wherein the first and second alignment features respectively include a first piston biased forward by a first resilient member and a second piston biased forward by a second resilient member.

37. The optical port of claim 36, wherein the first piston has a first cross-sectional shape and the second piston has a second cross-sectional shape, wherein the first cross-sectional shape is different than the second cross-sectional shape.

38. The optical port of claim 31 being a portion of a device having a frame, wherein the mounting body is disposed inside the frame and so that the at least one molded-in lens is exposed at a lens opening of the frame.

39. The optical port of claim 31, wherein the recess defines an enclosed perimeter, and a front side of the at least one mounting surface is flush with the outer wall of the device when the optical port is secured to the device.

* * * * *